(No Model.)  6 Sheets—Sheet 1.

P. P. HILL.
WIRE BARBING MACHINE.

No. 298,204.  Patented May 6, 1884.

WITNESSES:  INVENTOR (No Model.)

P. P. HILL.
WIRE BARBING MACHINE.

No. 298,204. Patented May 6, 1884.

WITNESSES:
Wallace Greene
J. H. Stearns

INVENTOR
Peter P. Hill
by Robt H. Wiles
ATTORNEY

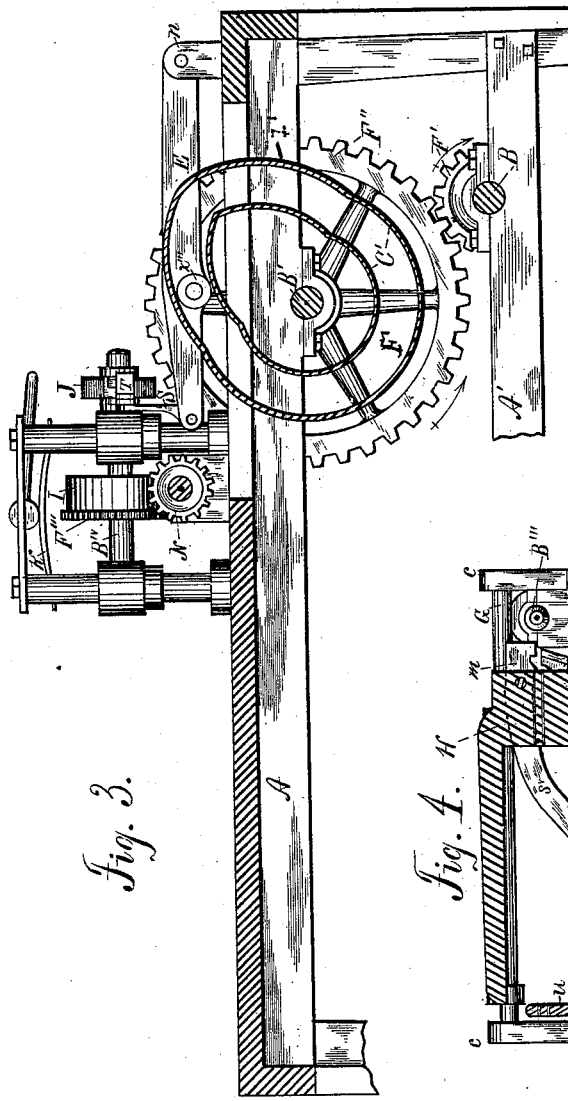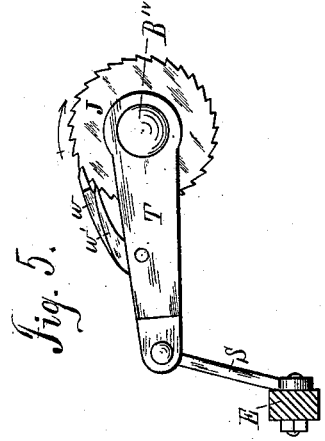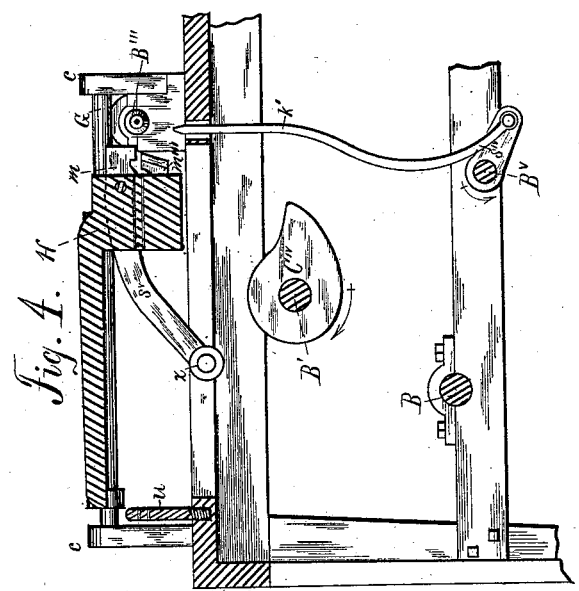

(No Model.) 6 Sheets—Sheet 4.

P. P. HILL.
WIRE BARBING MACHINE.

No. 298,204. Patented May 6, 1884.

WITNESSES:
Wallace Greene
J. H. Stearns

INVENTOR
Peter P. Hill
by Robt. H. Wiles
ATTORNEY (No Model.)

P. P. HILL.
WIRE BARBING MACHINE.

No. 298,204. Patented May 6, 1884.

6 Sheets—Sheet 5.

WITNESSES:
Wallace Greene
J. H. Stearns

INVENTOR
Peter P. Hill
by Robt. H. Wiles
ATTORNEY (No Model.) 6 Sheets—Sheet 6.
P. P. HILL.
WIRE BARBING MACHINE.
No. 298,204. Patented May 6, 1884.
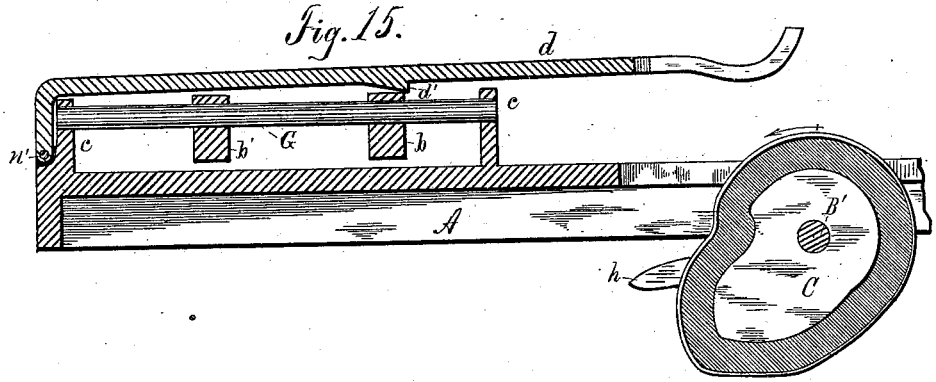
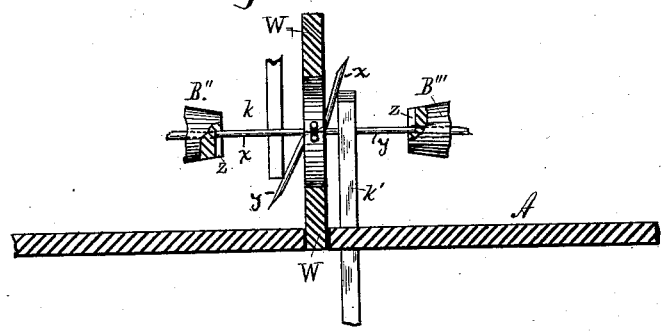
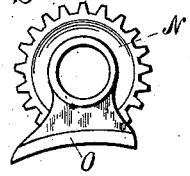
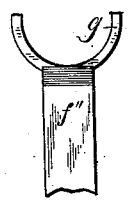
WITNESSES:
Wallace Greene
J. H. Stearns
INVENTOR
Peter P. Hill
by Robt. H. Wiles
ATTORNEY

UNITED STATES PATENT OFFICE.

PETER P. HILL, OF LEE, ILLINOIS, ASSIGNOR TO THE WASHBURN & MOEN MANUFACTURING COMPANY, OF WORCESTER, MASSACHUSETTS, AND ISAAC L. ELLWOOD, OF DE KALB, ILLINOIS.

WIRE-BARBING MACHINE.

SPECIFICATION forming part of Letters Patent No. 298,204, dated May 6, 1884.

Application filed November 30, 1883. (No model.)

*To all whom it may concern:*

Be it known that I, PETER P. HILL, a resident of Lee, in the county of Lee and State of Illinois, have invented certain new and useful Improvements in Wire - Barbing Machines; and I do hereby declare the following to be a full, clear, and exact description of the invention, such as will enable others skilled in the art to which it pertains to make and use the same.

My invention is a new and improved machine adapted to form automatically the four-point wire-fence barb illustrated in the accompanying drawings.

The operation of the machine is fully explained in the following specification, and its construction is described in the specification and shown in the accompanying drawings, in which—

Figure 1:
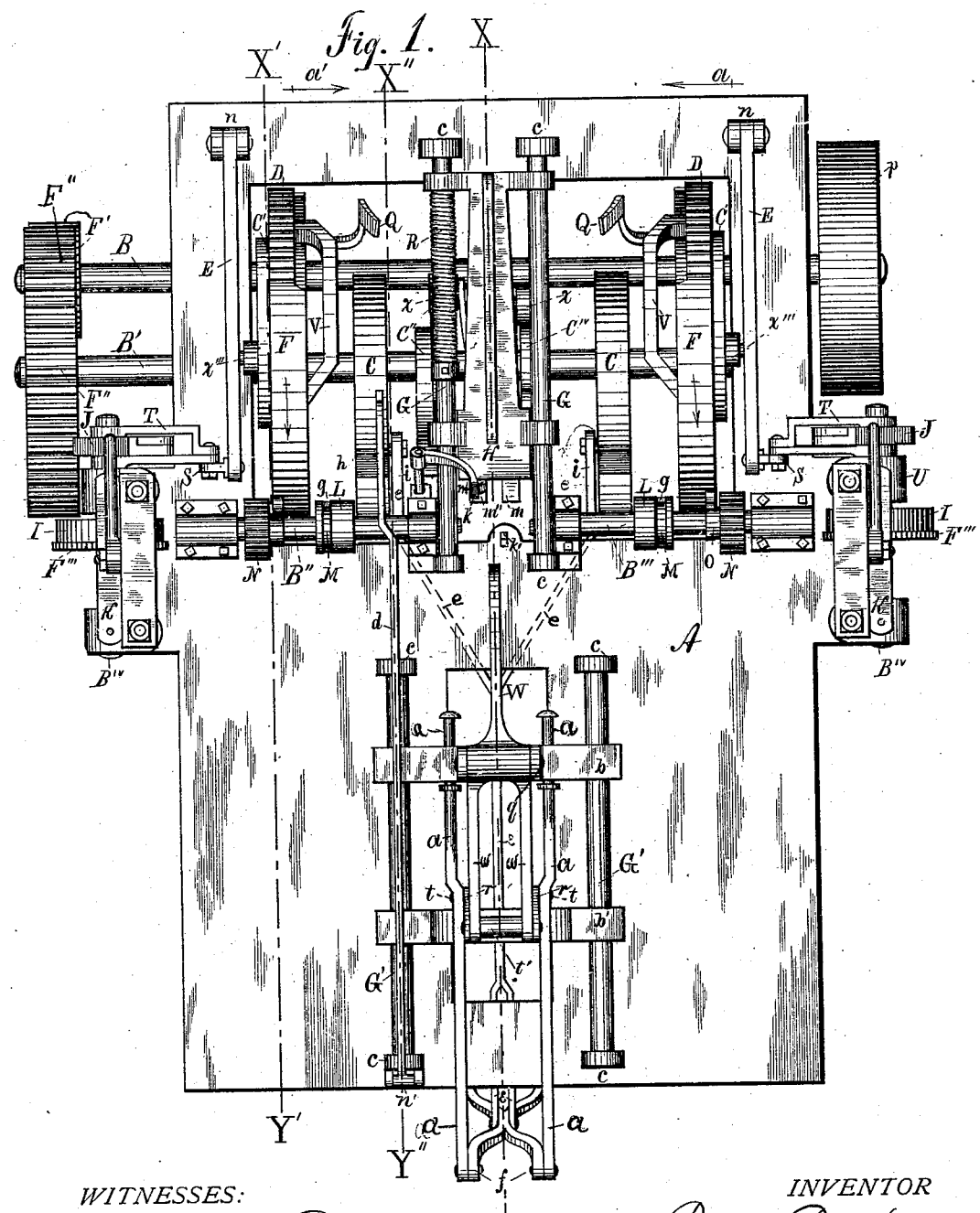
Figure 2:
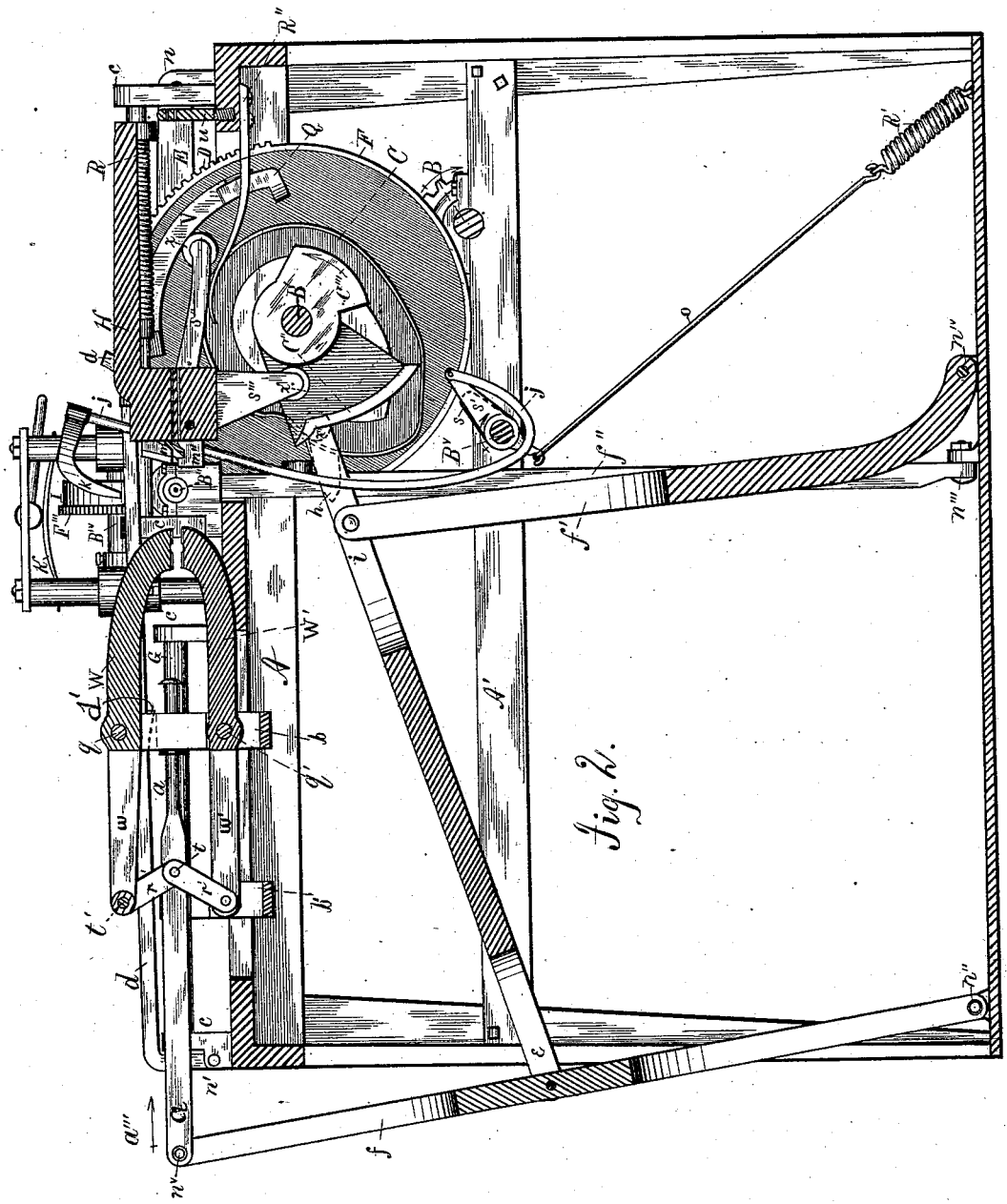
Figure 6:
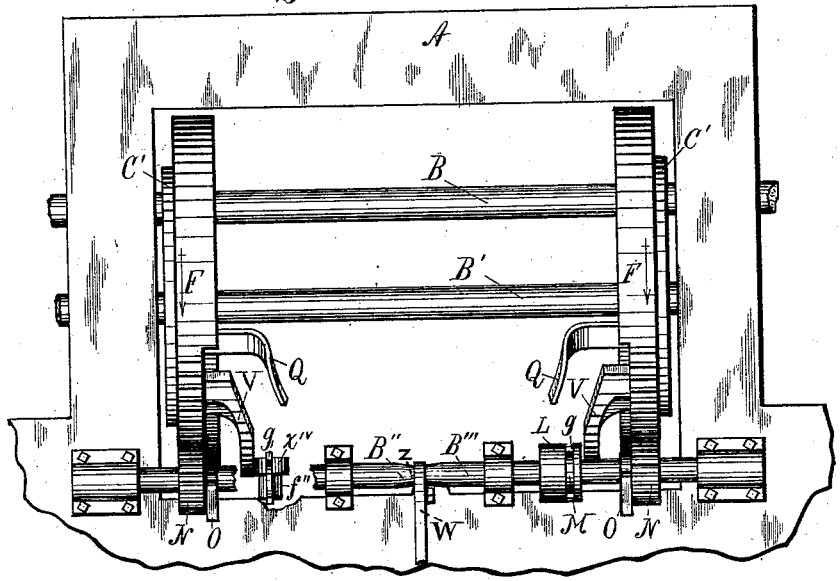
Figure 7:
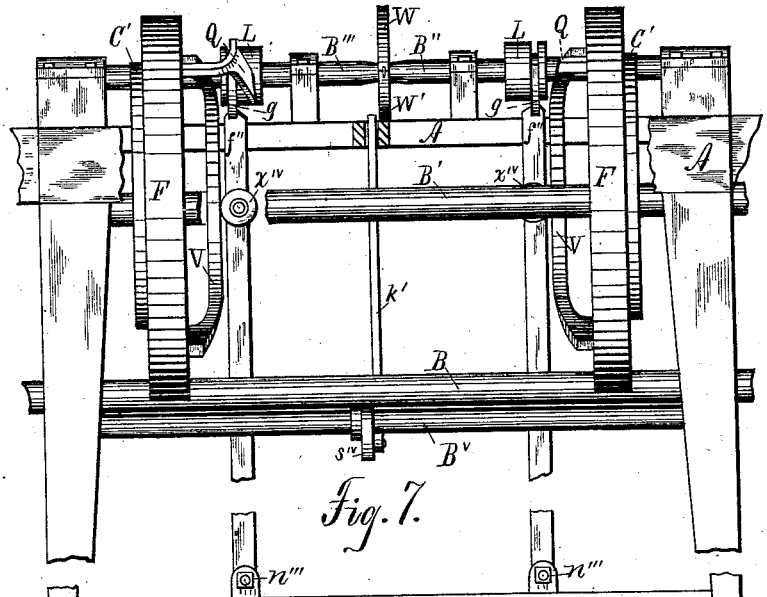
Figure 12:
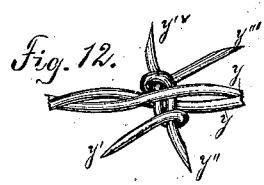
Figure 13:
Figure 14:
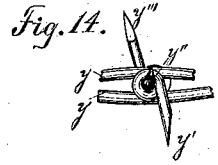

Figure 1 is a plan of the entire machine. Fig. 2 is a central vertical section thereof, looking in the direction indicated by the arrow $a$, Fig. 1, the plane of section passing through the line X Y, Fig. 1; Fig. 3, a vertical section through the line X′ Y′, Fig. 1, looking in the direction indicated by said arrow $a$; Fig. 4, a central vertical section of the cutting-head H, looking in the direction indicated by the arrow $a'$, Fig. 1, and showing the cam which actuates the knife $m$, and also the bender K, the plane of section being the same as that in Fig. 2; Fig. 5, a front elevation of the ratchet mechanism for imparting intermittent rotation to the barb-feeding rolls; Fig. 6, a plan showing the barb-forming spindles B″ B‴, together with the means for imparting intermittent rotary and reciprocal longitudinal motion to said spindles, the spindle B″ being partly removed to show parts beneath it; Fig. 7, a front elevation of same parts shown in Fig. 6, and showing in addition the bender K′ shown in Fig. 4; Figs. 8, 9, 10, and 11, plan views of the barb-forming parts, showing their respective positions in successive steps of the making of a barb; Figs. 12, 13, and 14, views showing the form and structure of the completed barb; Fig. 15, a vertical section through the line X″ Y‴, Fig. 1, looking in the direction indicated by the arrow $a$, nothing being shown but the ratchet-lever $d$ and the cam C which disengages it; Fig. 16, a transverse vertical section through the line X$^{iv}$ Y$^{iv}$, Fig. 9, looking in the direction indicated by the arrow $a''$ in said Fig. 9; Fig. 17, a side elevation of the pinion N and cam-face O thereto attached; Fig. 18, a side elevation of the upper end of the lever $f''$, which communicates reciprocal longitudinal motion to the spindle B″; and Fig. 19, a vertical transverse section of the feeding-jaws W W′, the plane of section passing through the line X‴ Y‴, Fig. 9.

In these views, A is the bed of the machine, and B the main shaft, to which power is applied.

On one end of the shaft B is rigidly mounted a pulley, $p$, and on the other end a pinion, F′, which engages with a gear-wheel, F″, mounted on a second shaft, B′, parallel to the shaft B. The shafts B B′ extend transversely across the machine, and are journaled in suitable boxes on opposite sides thereof, (see Figs. 2, 3, and 4;) and since the gear-wheels F′ F″ engage, the two shafts rotate in opposite directions, as indicated by arrows in the different figures.

Near the front end of the machine is rigidly attached to the bed a vertical post, $u$, Fig. 2, pierced near the top by two parallel horizontal holes, for the support and passage of two main wires, which are the strands of the cable to be barbed. These main wires run back through the machine in horizontal lines passing through the horizontally-perforated cutting-head H and between the jaws W W′, and thence out at the rear of the machine and into any suitable twisting and spooling device, being held taut by the strain of the spooling device and any suitable resisting tension. The feed of the main wires is intermittent, and is accomplished by means of the jaws W W′, which alternately advance and recede, closing upon the main wires at the end of each forward movement, and opening to release them at the end of each movement in the opposite direction. The lower jaw, W′, is rigidly attached to two blocks, $b\ b'$, which slide freely upon two parallel horizontal stationary guide-rods, G' G', near the rear of the machine and parallel to the line of the main wires, the jaw W' and the blocks b b' thus forming a rigid frame which has no motion within itself, but moves as a whole on the guide-rods.

In front of the block b the jaw W' is a single bar; but between the blocks b b' it is divided, forming two parallel side bars, w' w', which are bolted at their rear ends to the respective parts of the block b'. The upper jaw, W, is pivoted to the block b by a horizontal pin, q, which passes through the block and through the jaw near its middle. (See Figs. 1, 2.) The upper jaw, like the lower, is solid in front of the block b, and behind it is divided into two side bars, w w, and the rear end of each of the bars w is connected with the corresponding bar, w', by means of two short jointed levers, r r', forming a toggle-joint. The distance between the ends of the side bars, w, is maintained by means of a sleeve, t', within which is a bolt which passes through the ends of the side bars and forms the pivot for the upper ends of the toggle-levers r. The central pivots, t t, of the toggle-joints pass through the ends of the levers r r', and also through two horizontal rods, a a, which are on the outer sides of the levers. The front ends of the rods a a pass through holes in the block b, in which they slide freely, and their rear ends extend backward over the end of the bed, and are jointed to a divided vertical lever, f, whose foot is pivoted to the base of the machine at n'', Fig. 2. Each of the rods a a has an integrally-formed head at its front end, and a collar rigidly attached to it at a point between the blocks b b'.

It is evident that any forward movement of the rods a a will move the blocks b b' only when the collars press against the rear face of the block b, and that any backward movement of the rods will move the blocks only when the heads of the rods are against the front face of the block b. In other words, the collars and heads form limits within which the longitudinal motion of the rods a a deflects or straightens the toggle-joint, and so opens or closes the jaws W W' without moving them forward or back, while longitudinal motion of the rods beyond the limits fixed by the collars and heads has no tendency to open or close the jaws, but causes them to advance or recede as a whole.

Near the middle of the vertical lever f, already mentioned, is pivoted to it the rear end of a pitman, e, Figs. 1 and 2, extending forward and slightly upward, and supported near its front end by a second vertical lever, f', whose foot is pivoted to the base of the machine at $n^{iv}$. The rear end of the pitman e is divided into two parallel bars, which embrace the center of the lever f. At its middle the two bars are united in a single rod, and at its front end it is again divided into two divergent branches, i i, Figs. 1 and 2.

At the front end of each of the bars i, and on its outer face, is mounted, on a horizontal pin, an anti-friction roller, x'', and the two rollers play in grooves in the respective inner faces of two cams, C C, which are mounted on the shaft B', heretofore mentioned, (the connection of the pitmen and cams being shown in Figs. 1 and 2 and the form of one of the cams in Fig. 15.)

As shown in Fig. 2, the jaws are opened, and are advancing in the direction indicated by the arrow a''', Fig. 2, and the cams C C are rotating in the direction indicated by the arrow on the face of the cam C''' in the same figure. As the cam rotates, the jaws continue to advance until the roller x'' of each of the arms i reaches the point of least radius of the cam C, with which it engages. When the roller reaches the point of least radius of the cam, the forward movement of the jaws ceases, and as the rotation of the cam continues the radial distance between the shaft B' and the roller increases, the pitman e forces back the lever f, and the rods a a recede. The first effect of the backward movement of the rods a a is to draw back the central joint, t, of the toggle-levers, and thus close the front end of the jaws; and the form of the cams C C is such that the jaws remain closed for a considerable time before the heads of the rods strike the front face of the block b and cause a backward movement of the jaws W W'. When the heads of the rods strike the block b, however, the backward movement of the jaws begins, and this movement continues until, by the further rotation of the cam, the roller x'' reaches its point of greatest radius. From this point the roller again approaches the shaft B' and the rods a a again begin to move forward. The first result of the forward movement of the rods is to force forward the pivot t, already referred to, and thus open the jaws W W', and the jaws continue to open without moving forward until the collars on the rods a a reach the rear face of the block b, when the forward movement of the jaws again begins. The front portions of the jaws W W' curve downward and upward, respectively, until their contiguous faces meet in the horizontal plane midway between the two main wires. Each face is furrowed by a central longitudinal groove for the reception of one of the main wires, and cut by a transverse notch, for the reception of the barb-wires, as hereinafter set forth, (see Figs. 2, 16, and 17,) and the side faces of the jaws are slightly concave or countersunk, the centers of the countersinks being the transverse notches for the reception of the barb-wires.

It is evident that as the jaws move forward open they pass freely along the main wires; that when they close at the end of their forward movement they grasp the main wires which lie in the longitudinal grooves prepared to receive them; that as the closed jaws recede they draw with them the main wires, and that when they open at the close of their backward movement they release the main wires, and are in position to repeat the series of movements which they have thus performed. In other words, the jaws W W' and the devices by which they are moved constitute an intermittent feeding mechanism by means of which the main wires are fed through the machine at each revolution of the shaft B' a distance equal to the desired distance between the barbs on the completed cable. The two wires from which the barbs are cut and formed are fed in from opposite sides of the machine through two hollow spindles, B'' B''', which are journaled in suitable boxes, and are at right angles to the line of the main wire. (See Figs. 1, 2, 6, and 7.) Each wire has an intermittent feed, which consists of two ordinary feed-rolls placed one above the other on suitable shafts, and provided with geared side flanges, which engage one with the other, together with a pawl-and-ratchet device for imparting intermittent rotation to the feed-rolls.

The upper feed-rolls, I I, and their geared flanges F''' F''' are shown in Figs. 1, 2, and 3, the mechanism for rotating the rolls in Figs. 1, 3, and 5. In these views, which illustrate the mechanism employed for one set of rolls, J is a ratchet-wheel rigidly mounted on the shaft $B^{iv}$ of the upper feed-roll, I; w w', two gravity-pawls hung on the same pivot, and of such relative lengths that when the point of one pawl, w, is at the bottom of any given ratchet-notch the other pawl, w', is half-way between the bottom of the next notch and the point of the tooth which succeeds it. The pivot about which the two pawls swing fastens them to a lever, T, which oscillates in a vertical plane about the shaft $B^{iv}$ as a center, the free or swinging end of the lever being connected by means of a link, S, with the free end of a vertically-reciprocating lever, E, Figs. 1 and 3. The other end of the lever E is pivoted at n to a stationary support attached to the bed of the machine near the front end, and vertical oscillation is imparted to the lever by means of an anti-friction roller, $x'''$, which plays in a groove on the outer face of a cam-wheel, F, mounted on the shaft B'. The groove within which the roller $x'''$ moves is formed by two parallel flanges, C', Fig. 3, which are formed integrally with the cam-wheel F.

It is plain that the vertical oscillation of the lever E must impart reciprocal vertical motion to the lever T; that at each upward swing of the lever T the pawls w w' rotate the ratchet-wheel and feed-rolls, and thus feed the barb-wire through the space required for the forming of a barb, and that at each downward movement of the lever T the pawls must slip backward over the ratchet-teeth and fall alternately into the notches between the teeth. As the lever T drops downward one of the pawls w w' engages a tooth of the ratchet-wheel every time the lever moves a distance equal to half the space between two contiguous teeth. In other words, the successive new engagements of the pawl-and-ratchet device, as a whole, occur at the same intervals as if there were one pawl and the ratchet-spaces were only one-half as great as those shown. Thus by the use of two or more pawls the greatest accuracy and frequency of engagement may be attained without so reducing the size of the ratchet-teeth as to sacrifice the necessary strength.

Figure 8:
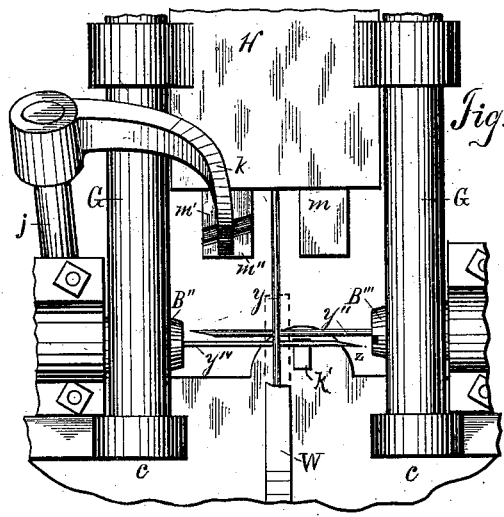
Figure 9:
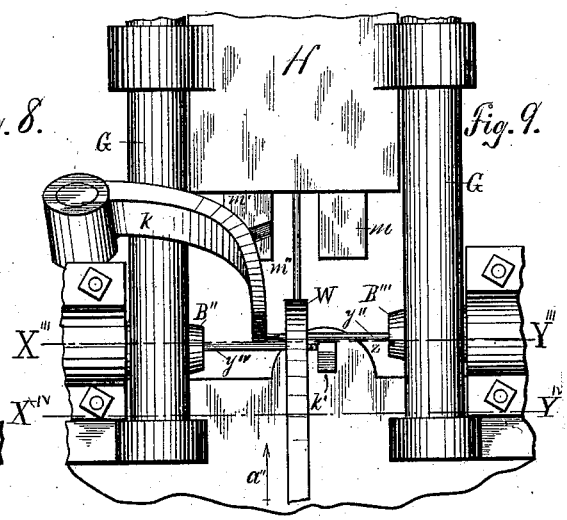

The feeding of the barb-wires is completed at the instant when the roller $x''$ of the pitman i is at the point of least radius of the cam C, or, in other words, at the moment when the open jaws W W' reach their forward limit of motion and the transverse notches in their contiguous faces are in line with the centers of the spindles. Immediately after the completion of the feed of the barb-wires the jaws close, pressing together the main wires which lie in the longitudinal grooves in their faces, and grasping firmly between the main wires the ends of the barb-wires. The main and barb wires being thus held stationary by the jaws W W', two benders, K K', above and below the bed, respectively, are thrust one downward, the other upward, against the respective ends of the barb-wires, which are thus bent, one down and the other up, into the positions shown in Fig. 16, the bent ends standing at an angle of about thirty degrees on either side of a vertical line, and very nearly parallel to each other. The upper bender, K, is shown in Figs. 1, 2, 8, 9, and 16, and the position of the lower, K', is indicated in Figs. 1, 8, and 9, and it is shown in full in Figs. 4, 7, and 16.

The means for imparting motion to the upper bender, K, are shown in Fig. 2, in which $B^v$ is a shaft extending across the machine very nearly in the vertical plane of the spindles B'' B''' and the horizontal plane of the main shaft B, the ends of the shaft being journaled in the opposite sides of the machine.

On the shaft $B^v$ is rigidly fastened a sleeve, with which is integrally formed an arm, s'; and to the end of the arm s' is jointed the end of a rod, j, whose lower part is bent into a loop which lies below the shaft $B^v$, while its upper portion is straight, and extends upward through a suitable opening in the bed, the bender K being rigidly fastened to the upper end of the rod.

On the shaft $B^v$ is fastened a second and shorter arm, s, which lies in the plane of the cam C, and is of such length as to be struck by a lug, h, forming part of said cam. As the cam C rotates in the direction indicated by the arrow on the face of the cam C''', the lug h, when it strikes the arm s, will evidently rotate the shaft $B^v$ in the direction indicated by the arrow thereon, and thus draw down the rod j and bender K. A coiled spring, R', is attached to the base of the machine, and connected by a link, o, with a hook rigidly fastened to the shaft $B^v$ on the side opposite the lever s, and the force exerted by the spring upon the hook draws the shaft $B^v$ back to its normal position as soon as the arm *s* is released by the lug *h*. The lower bender, K', is moved by means of an arm, *s*ⁱᵛ, rigidly attached to the shaft Bⁱᵛ, the lower end of the bender being connected by a suitable joint with the end of the arm, while the upper end extends upward through a suitable opening in the bed of the machine. (See Figs. 4 and 7.) The arms *s*ⁱᵛ and *s'* are on opposite sides of the shaft Bⁱᵛ, and therefore the rocking motion of the shaft which draws down the bender K at the same time thrusts upward the bender K'. The two benders thus act simultaneously, and the return of the shaft Bⁱᵛ to its normal position when released by the lug *h* brings both the benders back to the positions shown in Figs. 2 and 4.

The hollow spindles B″ B‴, through which the barb-wires are fed, have two motions, one being reciprocal longitudinal motion and the other intermittent rotary. The longitudinal motion of the two spindles brings them from the position shown in Fig. 1 to that shown in Figs. 6 and 7 and back again to their original position, while their rotary motion carries each of them through a single revolution about its axis during the time it is in the position shown in Figs 6 and 7. By their longitudinal movement the ends of the spindles are brought in contact with the bent ends of the barb-wires immediately after the benders K K' have done their work, and by their rotation they wrap the end of one barb-wire about the body of the other, and vice versa.

The two spindles are journaled in suitable boxes attached to the bed of the machine, in which they rotate and slide freely. On each spindle is rigidly mounted a pulley, L, in which is an annular groove, M, (see Figs. 1, 6, and 7,) and in the groove M plays freely a semi-annular fork, *g*, which forms the upper end of a vertical lever, *f*‴, Figs. 1, 2, 6, and 7. The lower ends of the levers *f*‴ are pivoted at *n*‴, Figs. 2 and 7, to the base of the machine, and each of them is provided with an anti-friction roller, *x*ⁱᵛ, which is mounted on a pin projecting from the front face of the lever at a point about in the horizontal plane of the shaft B'. (See Figs. 2, 6, and 7.) The rollers *x*ⁱᵛ lie directly under the pulleys L, and when the spindles B″ B‴ are in the position shown in Fig. 1 the rollers are very nearly in contact with the inner vertical faces of two cam-wheels, F, mounted on the shaft B', and equidistant from the central line of the machine.

Figure 10:
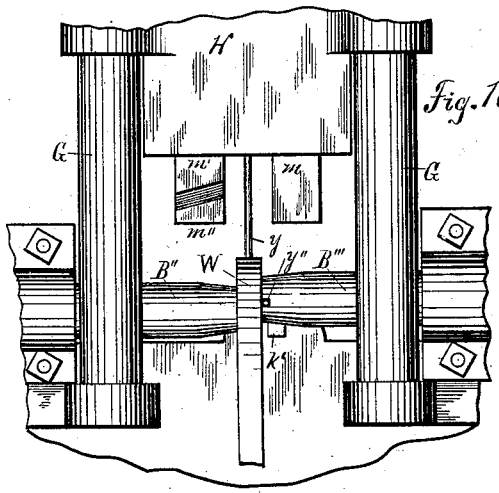
Figure 11:
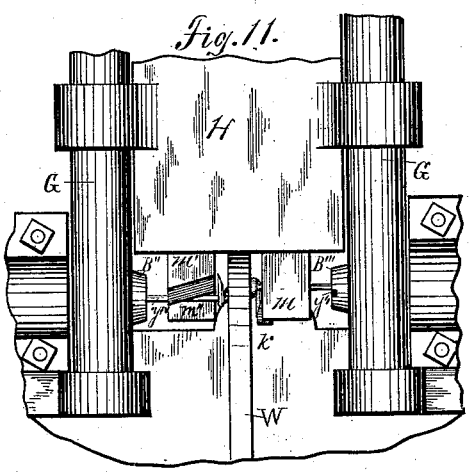

On the inner face of each of the wheels F is a cam-flange, V, whose middle portion is parallel to the face of the wheel, while both its ends are inclined planes, sloping from the middle part of the cam to the face of the wheel. An auxiliary flange, Q, parallel with the inclined plane at the end of the flange V, is rigidly attached to each of the wheels. (See Figs. 1, 2, 6, 7.) The distance of the rollers Xⁱᵛ from the center of the shaft B' is equal to the radius of the arc of the flange V, and the roller, therefore, lies in the path of rotation of the flange. The wheels F rotate in the direction indicated by arrows on their peripheries in Fig. 1, and when the inclined end of each of the cams U strikes the corresponding roller *x*ⁱᵛ the roller is thrown away from the face of the wheel and toward the center of the machine, and the two spindles B″ B‴, receiving the motion of the rollers *x*ⁱᵛ through the levers *f*‴, are moved longitudinally inward until their ends strike the side faces of the jaws W W', and receive the bent ends of the barb-wires in suitable notches, *z z*, Figs. 6, 16. The position of the spindles after being thrown inward to the center of the machine is shown in Figs. 6, 7, and 10, and the relative positions of the rollers and flanges V in Figs. 6 and 7. The spindles remain in the position shown in Figs. 6 and 7 so long as each of the rollers *x*ⁱᵛ remains in contact with the middle portion of the flange V, which is parallel to the face of the wheel F. As soon, however, as the revolution of the wheel carries such middle part of the flange past the roller, the auxiliary flange Q catches the roller and carries it back to the position from which it was taken by the flange V, thus bringing the two spindles into the position shown in Fig. 1. A geared segment, D, occupies an arc of about sixty degrees of the periphery of each of the wheels F, and two pinions, N N, mounted on the spindles B″ B‴, respectively, are thrown into engagement with the segments at the moment when the ends of the spindles reach the position shown in Fig. 6. As shown in Fig. 1, the pinions N N are nearer the outer edges of the bed than the segments D D. The longitudinal movement of the spindles toward the center of the bed, however, brings the pinions into the path of the segments at the moment when the notches in the ends of the spindles receive the bent ends of the barb-wires. The length of the segment and the size of the pinion N are such that the pinion, with the spindle to which it is attached, rotates once about its axis while the pinion and segment are in engagement, and the end of each barb-wire is wrapped once about the body of the other by means of this rotation. Any rotary motion of the spindles, except when the pinions are in contact with the respective segments, is prevented by means of the cam-faces O, formed integrally with the pinions, and adapted to slide on the peripheries of the wheels F. These cam-faces are in contact with the peripheries of the wheels until the instant when the pinions engage the segments; but that portion of the periphery of each wheel which is occupied by its segment is narrower than the remainder of the rim, being cut away to allow the cam-face to rotate, and as the pinion engages with the segment the cam-face slides off the smooth rim of the wheel. For the form and position of the faces O, see Figs. 1, 6, 7, and 17.

Immediately after the completion of the wrapping of the barb-wires, the spindles B″ B‴ recede from the center of the machine to the position shown in Fig. 1. The jaws W W′ remain stationary, however, until the barbs are severed by suitable knives attached to the sliding head H. (Shown in Figs. 1, 2, 4, and 11.) The head H slides longitudinally on two stationary horizontal guide-rods, G G, the motion of the head toward the barb-wires being imparted to it by means of a cam, C‴, mounted on the shaft B′, and acting on an anti-friction roller, $x'$, which is attached to the lower side of the head, (see Fig. 2,) while the reverse motion of the head is communicated to it by a spring, R, Figs. 1 and 2, coiled about one of the rods G, and so arranged as to be compressed when the head moves toward the barb-wires. To the head are attached two pairs of vertically-cutting knives or shears, $m\ m'''\ m'\ m''$, the upper knife, $m'$, of one pair and the lower knife, $m'''$, of the other pair being rigidly fastened to the head, and being, so far as the cutting is concerned, stationary knives, while the other two knives, $m\ m''$, are pivoted in the head (see Figs. 2, 4) and move downward and upward, respectively. The movable knives $m\ m''$ are provided with integrally-formed backwardly-extending lever $s^v\ s''$, on the ends of which are mounted anti-friction rollers $x$. The lever $s^v$ of the knife $m$ is forced upward by a cam, $C^{iv}$, mounted on the shaft B′, Figs. 1, 4, and the lever $s''$ is forced downward by the cam-flange C″, which is formed integrally with the cam C‴ and mounted on the shaft B′, Figs. 1, 2. Just before the knives $m\ m''$ close upon the stationary knives $m'''\ m'$, the head is moved by the cam C‴ until the knives reach the position shown in Fig. 11, and the head remains stationary until the cutting of the barb-wires is completed. While the head is thus stationary the knives $m\ m''$ close upon the barb-wires at a suitable distance on each side of the wraps formed by the ends of the wires. The movable knives, in closing, pass the edges of the stationary knives sufficiently to sever the barb-wires, and at the same time to bend the severed ends $y''\ y^{iv}$, Figs. 11, 13 upward and downward, respectively, thus completing the barb. Immediately after the completion of the cutting of the barb-wires the knives open and the head H recedes to the position in which it is shown in Fig. 1. The barb being finished, the jaws W W′ move backward, grasping the main wires and the finished barb, until they reach their limit of motion in that direction, the space through which they travel being the distance between two contiguous barbs in the finished fence-cable. They then open and release the wires and again move forward to assist in the forming of another barb.

To insure perfect steadiness of the jaws W W′ during the time when they are required to remain stationary, a ratchet-bar, $d$, Figs. 1, 2, 15, is hinged to the bed of the machine at $n'$, and extends forward, resting upon the blocks $b\ b'$, which slide on the guides G′, and carry the jaws. The lower edge of the bar $d$ is provided with a ratchet-tooth, $d'$, so placed as to drop down in rear of the block $b$ at the moment when the jaws reach their forward limit of motion. The tooth remains in this position and prevents any accidental longitudinal motion of the jaws during the entire operation of bending, wrapping, and cutting the barb-wires. At the instant of completion of these operations, however, the front end of the lever $d$ is raised by the cam C, already described, the tooth $d'$ rises above the block $b$, and the jaws are released and allowed to recede and draw with them the main wires. The barbs being formed and placed at regular intervals between the main wires, the latter are intertwisted by any suitable mechanism placed behind the machine, and the cable thus formed is reeled at the same time, the barbs being held in place in the cable by the twist of the main wires.

It is evident that the devices for feeding the main wires may be dispensed with, and the barbs formed, as described, by the remaining mechanism may be taken from the machine and afterward fed between two main wires by any suitable independent mechanism. In this case the jaws W W′ would be replaced by two jaws provided with means for closing them upon the barb-wires, but having no horizontal motion.

The forms of what may be called the "working parts" of this machine—that is to say, the jaws for feeding the main wires, the feed-rolls for the barb-wires, the plungers for bending the ends of the barb-wires, the spindles for intertwisting them, and the knives for severing them—may be greatly changed without affecting their operation, and the system of shafts, cams, and levers by which these working parts are moved may be radically changed without altering the principle of the machine or its essential motions. I do not, therefore, desire to limit my invention to the combination of the working parts of the machine with the particular mechanical devices by means of which they are operated; neither do I consider it essential that all of these working parts be combined in a single machine, for it is evident that if one or more of them be replaced by other equivalent devices the remaining parts will perform their respective functions equally well in the new combination thus formed.

Having now described my invention and explained its operation, what I claim as new, and desire to secure by Letters Patent, is—

1. In a machine for forming wire-fence barbs, the combination of means for supporting two barb-wires whose free ends lie in opposite directions, means for intermittingly feeding said wires into a position in which their ends overlap each other and lie side by side, means for wrapping the end of each of said wires about the other, leaving the points projecting, and means for severing said wires at suitable distances from the wraps so formed.

2. In a machine for forming wire-fence barbs, the combination of means for supporting and intermittingly feeding from opposite directions two barb-wires whose free ends at the close of each feed overlap each other and lie side by side, means for grasping said overlapping ends midway between their respective points, means for wrapping the end of each wire about the other wire, the wraps so formed being on opposite sides of said grasping device, and means for severing said wires at suitable distances from the wraps.

3. In a machine for forming wire-fence barbs, the combination of means for supporting and intermittingly feeding from opposite sides of the machine two barb-wires whose ends at the close of each feed overlap each other and lie side by side, means for grasping said overlapping wires at a point midway between their ends, means for bending in opposite directions the ends of said wires, which project on opposite sides of said grasping device, means for wrapping the bent end of each of said wires about the other wire, and means for severing said wires at suitable distances from the wraps formed thereon.

4. In a machine for forming wire-fence barbs, the combination of two hollow spindles lying on opposite sides of the machine and in the same straight line, and journaled in suitable bearings, in which they have longitudinal and rotary motion, means for intermittingly feeding barb-wires through said spindles toward the center of the machine, whereby the inner ends of said wires at the close of each feed overlap each other and lie side by side, means for grasping said wires at a point midway between their ends, means for bending upward and downward, respectively, the projecting ends of said wires, which lie on the opposite sides of said grasping device, means for sliding said spindles inward toward the center of the machine until they engage the bent ends of said wires, means for rotating said spindles and wrapping the end of each wire about the other wire, means for sliding said spindles outward in their bearings, and thereby releasing the ends so wrapped, and means for severing said wires at suitable distances from said wraps.

5. The combination of the hollow spindles B" B''', journaled in suitable bearings, the pinions N, and cam-faces O, rigidly mounted on said spindles, the flange and segment wheels F, co-operating with said pinions and cam-faces to produce intermittent rotary motion of said spindles, and suitable means for imparting reciprocal longitudinal motion to said spindles, substantially as and for the purpose set forth.

6. The combination of the hollow spindles B" B''', journaled in suitable bearings, suitable means for imparting intermittent rotary motion to said spindles, the grooved collars L, mounted on said spindles, the swinging levers $f'''$, whose forked ends $g$ play in the grooves in said collars, the rollers $x^{iv}$, mounted on said levers, the cam-wheels F, and the cam-flanges V Q, rigidly attached to said wheels and co-operating with said rollers $x^{iv}$, whereby reciprocal longitudinal motion of said spindles is effected, substantially as shown and described, and for the purpose set forth.

7. The combination, with means for feeding and means for supporting two barb-wires, substantially as set forth, of the two benders, K K', above and below the ends of the wires, respectively, the shaft $B^v$, journaled in suitable bearings, the cranks $s'$ $s^{iv}$, mounted on said shaft and connected with said benders K K', respectively, and means, substantially as described, for partly rotating said shaft, whereby the benders K K' bend the ends of the barb-wires downward and upward, respectively, substantially as and for the purpose set forth.

8. The combination of the hollow spindles B" B''', means, substantially as shown and described for imparting rotary and longitudinal motion thereto, means for intermittingly feeding a barb-wire through each of said spindles, the benders K K' above and below the ends of said wires, respectively, means for thrusting said benders downward and upward, respectively, against the respective ends of said wires, and means for severing said wires after the wrapping of their ends, substantially as shown and described, and for the purpose set forth.

9. The combination of the guides G G and head H, sliding thereon, the two pairs of knives $m''$ $m'$ and $m$ $m'''$, attached thereto, substantially as described, cam C''', and spring R, adapted to impart reciprocal longitudinal motion to said head, and cams C'' $C^{iv}$, adapted to operate said knives, respectively, substantially as shown and described, and for the purpose set forth.

10. In a wire-barbing machine, the combination of means for supporting two main wires, means for intermittingly feeding forward said main wires, means for feeding two barb-wires across and between the main wires from opposite sides thereof, means for wrapping the end of each barb-wire about the other barb-wire, the two wraps so formed being on opposite sides of said main wires, and means for severing said barb-wires at suitable distances on either side of the main wires.

11. In a wire-barbing machine, the combination of means for supporting two main wires, means for intermittingly feeding said main wires, means for feeding two barb-wires across and between the main wires from opposite sides, means for grasping the main and barb wires at their point of crossing, means for bending downward and upward, respectively, the projecting ends of said barb-wires, means for wrapping the bent end of each of said barb-wires about the other barb-wire, the two wraps so formed being on opposite sides of the main wires, and means for cutting said barb-wires at suitable distances on either side of said main wires.

12. In an automatic wire-barbing machine, the combination of suitable means for supporting two main wires, suitable means for feeding two barb-wires across and between said main wires from opposite sides, two reciprocally-sliding clamping-jaws adapted to grasp the main and barb wires at their point of crossing and hold them stationary during the formation of the barb, and to recede and carry with them the main wires at the completion of the barb, means for wrapping the projecting end of each barb-wire about the other barb-wire while said jaws are stationary, and means for cutting said barb-wires at suitable distances on either side of said clamping-jaws.

13. In a wire-barbing machine, the combination of two reciprocally-sliding jaws adapted to open and close, means for supporting two main wires in the line of and between said clamping-jaws, means for feeding two barb-wires across and between said main wires from opposite sides thereof, means for operating said jaws, whereby they are made to advance while open, to close upon said main and barb wires at their crossing, to hold said wires stationary during the formation of a barb, to recede, still grasping said wires, thereby feeding forward the main wires, and to open at the end of said retrograde movement and release said wires, means for bending upward and downward, respectively, the projecting ends of said barb-wires, means for wrapping the bent end of each barb-wire about the other barb-wire, and means for cutting said barb-wires at suitable distances on either side of said clamping-jaws.

14. The combination of the guides $G'$ $G'$, blocks $b$ $b'$, sliding thereon, jaw $W'$, rigidly attached to said blocks, jaw $W$, pivoted to the block $b$, toggle-levers $r$ $r'$, connecting the rear ends of said jaws, rods $a$, passing through the block $b$ and pivoted to the toggle-levers $r$ $r'$ at their intersections, suitable stops on the rods $a$, in front of and behind the block $b$, and means for imparting reciprocal longitudinal motion to the rods $a$, whereby the jaws $W$ $W'$ are caused to slide forward and back on the guides $G'$ $G'$ and to alternately open and close, substantially as shown and described, and for the purpose set forth.

15. The combination of the jaws $W$ $W'$, rods $a$, lever $f$, pitman $e$, lever $f'$, supporting the end of said pitman, roller $x''$, pivoted to the end of said pitman, and a suitable cam for imparting reciprocal motion to said pitman, substantially as shown and described, and for the purpose set forth.

16. The combination, with means for supporting the main and barbed wires, substantially as shown and described, of the jaws $W$ $W'$, longitudinally grooved for the reception of the main wires and transversely notched for the reception of the barb-wires, substantially as and for the purpose set forth.

17. The combination, with the jaws $W$ $W'$ and means, substantially as set forth, for imparting to them a reciprocal longitudinal motion, of the ratchet-bar $d$, adapted to engage said jaws when at their forward limit of motion and hold them stationary while in such engagement, and the cam $C$, adapted to raise said ratchet-bar and release said jaws, substantially as shown and described, and for the purpose set forth.

In testimony whereof I have signed this specification in the presence of two subscribing witnesses.

PETER P. HILL.

Witnesses:
J. A. CRAIN,
B. I. BUCKLEY.